(12) United States Patent
Sartor

(10) Patent No.: US 6,278,483 B1
(45) Date of Patent: Aug. 21, 2001

(54) IMAGE REGISTRATION ON REPEATED SCANS USING FIDUCIAL MARKS

(75) Inventor: Kenneth Sartor, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/276,073

(22) Filed: Mar. 25, 1999

(51) Int. Cl.$^7$ .............................. H04N 5/253; H04N 9/47
(52) U.S. Cl. .................... 348/96; 348/94; 348/95
(58) Field of Search .............................. 348/94–99, 103, 348/106, 112, 190, 195; 396/20, 308, 332; 355/64

(56) References Cited

U.S. PATENT DOCUMENTS

| | | |
|---|---|---|
| 3,234,863 | 2/1966 | Peterson et al. . |
| 3,409,796 | 11/1968 | Money . |
| 4,777,515 * | 10/1988 | Aikoh et al. ........................... 355/64 |
| 4,837,711 * | 6/1989 | Suzuki ................................. 395/101 |
| 5,198,857 | 3/1993 | Goto ...................................... 355/53 |
| 5,198,907 * | 3/1993 | Walker et al. ........................ 358/296 |
| 5,585,886 | 12/1996 | Yabe ...................................... 355/41 |
| 5,587,752 | 12/1996 | Petruchik ............................. 396/315 |
| 5,606,379 | 2/1997 | Williams .............................. 396/308 |

* cited by examiner

Primary Examiner—Vu Le
(74) Attorney, Agent, or Firm—Milton S. Sales

(57) ABSTRACT

A process for obtaining image coordinates of pixels of a digital image scanned from an original image on photographic film that has at least two fiducial marks on the photographic film associated with the original includes the steps of scanning an area of the photographic film, including the original image and the fiducial marks, with an original scan resolution to form an original digital image. The dimensional position of the fiducial marks in the original digital image is detected, and the dimensional distance between pairs of the fiducial marks is determined. The number of pixels in the original digital image between the pairs of fiducial marks is determined, and image coordinates of a location of a selected pixel of the original digital image are referenced with respect to the fiducial marks. The referencing is effected by computing a dimension-to-pixel conversion factor $\alpha$ by dividing the dimensional distance between pairs of the fiducial marks by the number of pixels in the original digital image between the pairs of fiducial marks, and storing the dimension-to-pixel conversion factor, the reference location of the selected pixel, the original scan resolution, the dimensional distance between pairs of the fiducial marks, and the number of pixels in the original digital image between the pairs of fiducial marks on the film.

6 Claims, 2 Drawing Sheets

IMAGE REGISTRATION ON REPEATED SCANS USING FIDUCIAL MARKS

FIELD OF THE INVENTION

This invention relates generally to image scanning of photographic film and the like.

BACKGROUND OF THE INVENTION

Standards Organizations such as ISO and ANSI or system specifications specify image area positioning tolerances by denoting the maximum and minimum capture area on photographic film for a given format (i.e., size 135, size 126, size 120, size 110, APS, etc.). The minimum and maximum print area requirements for a photofinisher are also specified. These image area positioning tolerances allow the location of the exposed image to vary. This variability in image location leads to positioning difficulties when the film is scanned by a film scanner and subsequently re-scanned by the same or a different scanner. A key problem existing in current imaging systems is the difficulty in accurately repositioning of the image to the exact location of the previous scanning session.

Presently, photographic film is manually or automatically positioned in a film gate with the aid of perforation or edge detection schemes. Such perforation and edge detection schemes inherently have substantial position variability to their design when compared to digital image pixel resolution. This position variability can result in misaligned images if they are repositioned between multiple scans by the same or by different pieces of equipment. Many scanners mechanically move the film under a CCD array sensing head and convert the analog into a digital image. Due to mechanical registration tolerances, the film strip may be positioned under the sensing head differently each time. If the film is scanned in a different scanner, additional variabilities such as mechanical and resolution differences are introduced. For these reasons, a system to more accurately and repeatedly register the digital image for each scan is desired.

DISCLOSURE OF THE INVENTION

It is an object of the present invention to provide a system to more accurately and repeatedly registering a digital image for each scan of photographic film.

It is another object of the present invention to provide for the reduction in scan-to-scan variability within a given scanner.

It is another object of the present invention to provide for the reduction in scan-to-scan variability between different scanners.

It is another object of the present invention to provide for resolution independence so that a desired pixel can be found despite the resolution.

It is another object of the present invention to provide fiducial marks on the photographic film to enable repeatable scanning, printing, and image manipulation. These marks will provide an absolute reference point from which to make corrections to the digital image.

According to a feature of the present invention, a process for obtaining image coordinates of pixels of a digital image scanned from an original image on photographic film that has at least two fiducial marks on the photographic film associated with the original image, the process comprising the steps of scanning an area of the photographic film, including the original image and the fiducial marks, with an original scan resolution to form an original digital image. The dimensional position of the fiducial marks in the original digital image is detected, and the dimensional distance $|fid_1-fid_2|$ between pairs of the fiducial marks is determined. The number of pixels in the original digital image between the pairs of fiducial marks is determined, and image coordinates of a location R of a selected pixel of the original digital image are referenced with respect to the fiducial marks. The referencing is effected by computing a dimension-to-pixel conversion factor $\alpha$ by dividing the dimensional distance $|fid_1-fid_2|$ between pairs of the fiducial marks by the number of pixels in the original digital image between the pairs of fiducial marks, and storing the dimension-to-pixel conversion factor $\alpha$, the reference location R of the selected pixel, the original scan resolution, the dimensional distance $|fid_1-fid_2|$ between pairs of the fiducial marks, and the number of pixels in the original digital image between the pairs of fiducial marks on the film.

According to a feature of the present invention, the process may further involve the additional steps of re-scanning the area of the photographic film with a re-scan resolution to form a re-scan digital image; detecting the position of the fiducial marks in the re-scan digital image; reading the dimension-to-pixel conversion factor $\alpha$, the reference location R of the selected pixel, the original scan resolution, the distance $|fid_1-fid_2|$ between pairs of the fiducial marks, and the number of pixels in the original digital image between the pairs of fiducial marks stored on the film; determining the number of pixels in the re-scan digital image between the pairs of fiducial marks; computing a scanner tolerance correction factor $\gamma$ by dividing the number of pixels in the original digital image between the pairs of fiducial marks by the number of pixels in the re-scan digital image between the pairs of fiducial marks; computing a resolution scaling factor $\rho$ by dividing the re-scan resolution by the original scan resolution; and determining corrected image coordinates of the location $R_{corrected}$ of the selected pixel by multiplying the reference location R of the selected pixel, the scanner tolerance correction factor $\gamma$, the resolution scaling factor $\rho$, and the dimension-to-pixel conversion factor $\alpha$.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art. While the invention is described below in the environment of an APS format photo system, it will be noted that the invention can be used with other types of photo systems.

Figure 1:
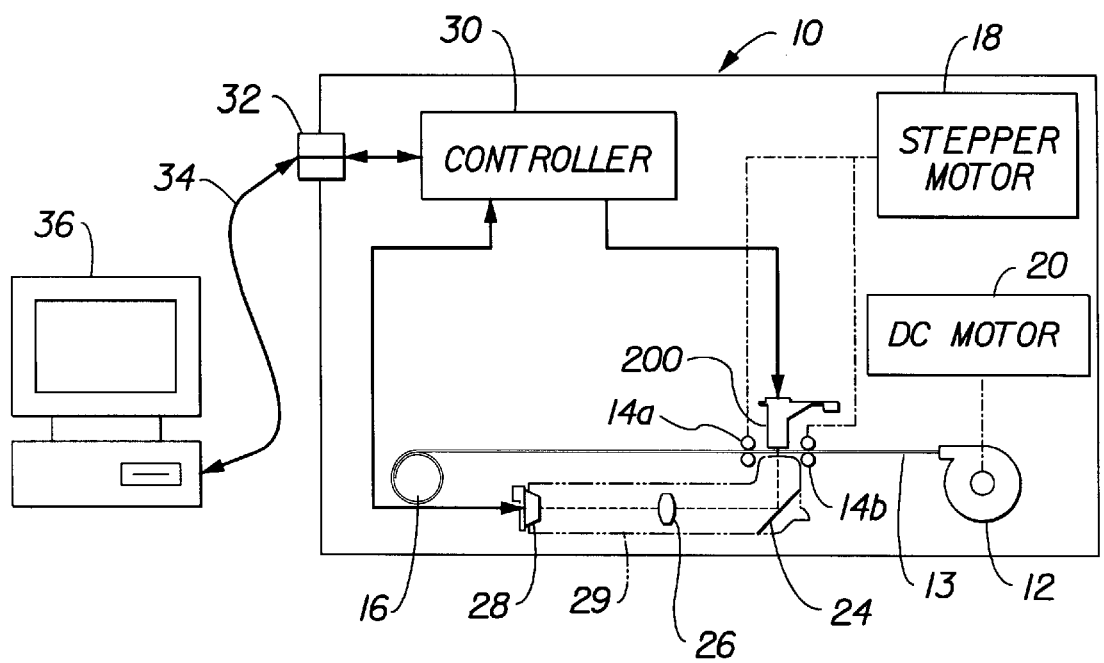
FIG. 1 is a schematic diagram of a photographic film scanner of the type for which the present invention is particularly adapted.

In FIG. 1, a film scanner 10 is shown schematically and has therein a film supply cartridge 12 from which a processed filmstrip 13 extends through a film transport mechanism, comprising a pair of nip rollers 14a and 14b, to a film take-up chamber 16.

The nip rollers are driven by a stepper motor 18 in the forward direction during high speed film advance and low speed image scanning and in the reverse direction during high speed rewind of the film into the film cartridge. A dc motor 20 couples with the spool of the film supply cartridge to initially thrust the filmstrip from the cartridge to the nip rollers and later to drive the cartridge spool in the reverse direction during rewind of the film back into the cartridge. The space between the nip rollers 14a and 14b forms an imaging gate, also referred to as a scan gate, and accommodates an illumination and imaging channel comprising an LED illuminant head assembly 200 for producing and transmitting scanning light through the film and an imaging assembly 29 for focusing the transmitted image light onto a light sensor. Illuminant head assembly 200 preferably comprises a centrally located linear array of interleaved, spectrally separated LED light sources emitting light respectively in the red, blue and green spectra for use in scanning the image frames on the filmstrip. Imaging assembly 29 comprises a mirror 24, a focusing lens 26 and a linear array CCD sensor 28. The CCD sensor is preferably a trilinear sensor having three parallel sensor array each covered with one of a suitable red, blue and green filter to render the linear sensors separately responsive to the red, blue and green LED illuminants from the illuminant assembly.

The transport mechanism comprises DC motor 20 connected to spool film cartridge 12 for thrusting the film out of the cartridge and for rewinding the film back into the cartridge at the conclusion of scanning. Once the film has been thrust out of the cartridge, the film encounters nip rollers 14a, 14b that are controlled by stepper motor 18. The nip rollers are placed such that one set is on either side of the frame imaging gate. Once the film is thrust out of the cartridge, DC cartridge spool motor 20 is turned off and the nip rollers controlled by the stepper motor 18 are used to move the film out of the cartridge. To rewind the film, both the stepper motor and the DC motor are turned on, and film is retrieved back into the cartridge. Another DC motor (not shown) is used to switch the nip rollers from a high-speed gear to a low speed gear state. For gross film positioning, such as when getting from one image frame position to another, the high speed state is used. Scanning within a particular frame is done in the low speed state to achieve the desired image resolution.

A controller 30 is programmed through software to control the overall operation of the scanner as well as to perform basic data processing functions on the output signals from the CCD array. The controller operates the stepper motor and dc motor to thrust and transport the film through imaging station. The controller also operates to vary the step rate of the stepper motor to achieve desired image scan resolution and also to control the timing for the CCD sensor and the LED array. It also controls a data transfer interface 32 to transfer data from the scanner via a cable 34 to a host computer 36. Program commands from the host computer are also sent via the cable and interface to the controller 30.

Figure 2:
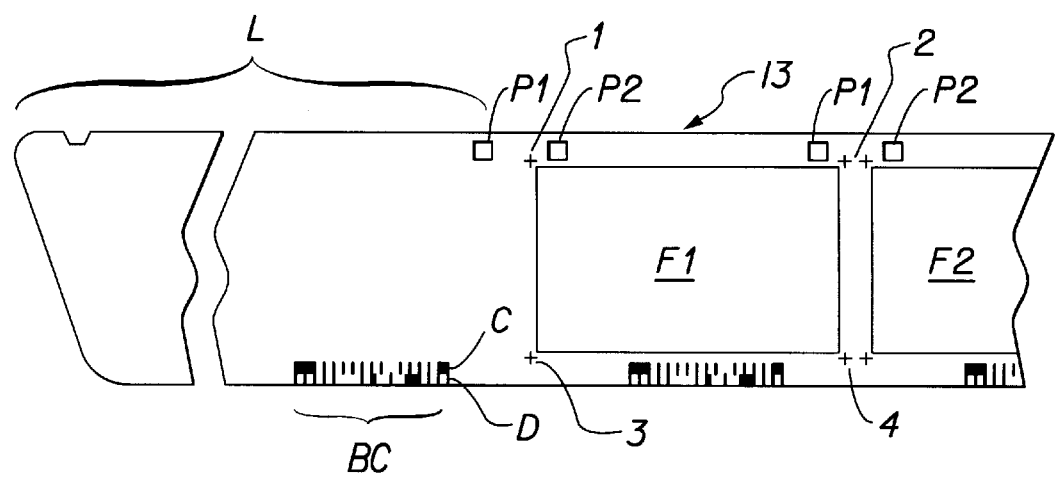
FIG. 2 is a portion of a filmstrip according to the present invention.

FIG. 2 illustrates a portion of an Advanced Photo System (APS) processed filmstrip 13 for use in the scanner 10. The filmstrip comprises a leader portion L and a series of image frame areas F1, F2, etc. The positioning of the image frame areas are set at the time of exposure in the camera by reference to perforations pairs P1 and P2 spaced evenly along one marginal edge region of the filmstrip. At the time of film manufacture, a latent image of an optical bar code image BC is pre-exposed repetitively in the longitudinal direction of the filmstrip along the marginal edge region opposite that of the perforations and adjacent to each frame area. An initial bar code is provided in a leader portion L just ahead of the first image frame F1, as shown in the drawing. In general, the bar codes each comprise a longitudinal row of clock elements C and a longitudinal row of data elements D. The data elements provide information about the filmstrip characteristics as well frame numbers uniquely identifying each of the image frame areas. The initial bar code in the leader portion also includes filmstrip specific information, such as roll length (i.e. number of image frames on the filmstrip) and roll ID number, both of which are important to have read before image frame scanning is commenced.

As the film is moved relative to CCD array 28 the analog image is converted into a digital image. Due to mechanical registration tolerances, filmstrip 13 may be positioned above imaging assembly 29 differently each time. If filmstrip 13 is scanned in a different scanner, additional variabilities such as mechanical and resolution differences are introduced. For these reasons, a means to "electronically register" the digital image for each scan is provided to enable the corrections to be applied to the same digital image pixel on the next scan. Essentially, electronic registration will provide a reference point from which to access specific pixel locations within the digital image.

A series of fiducial marks 1–4 have a predictable density ($D_{MAX}$) and are located at edges of each image area. Fiducial marks 1–4 will enable repeatable scanning, printing, and image manipulation. These marks will provide an absolute reference point from which to make corrections to the digital image. The fiducial marks are pre-exposed during the film manufacturing process. These can be high density cross hairs (such as shown in FIG. 2) or squares. The fiducial marks are placed outside of the image areas to prevent them from being overwritten during the exposure process in the camera.

After processing, the film is scanned at a very low resolution. The user selects the image to be edited from the low-resolution digital index print. Using densitometer, the scanner firmware locates the fiducial marks (See FIGS. 3 and 4 for close up views of fiducial marks of widths spanning two and three pixels, respectively) such as by detecting the edge of opposing sides of the fiducial marks in a given direction and then averaging to get to the center. This is done in both the x and y directions.

Figure 3:
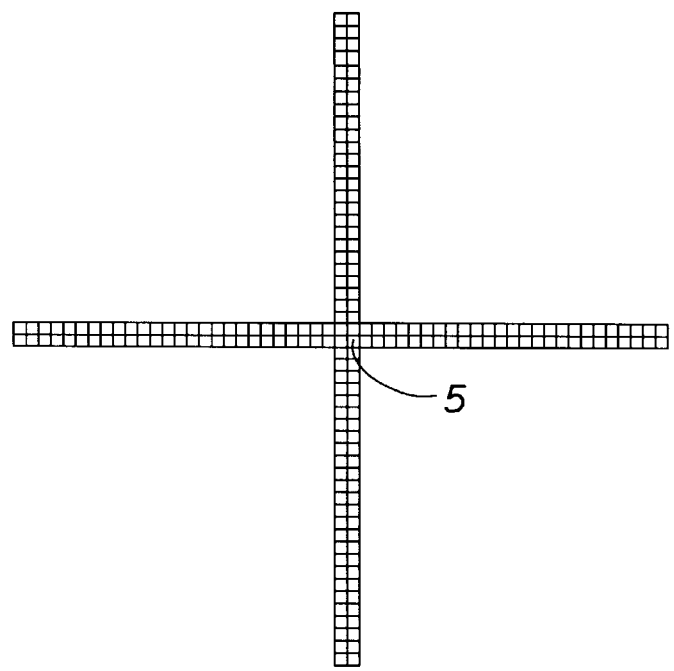
FIG. 3 is an enlarged view of a portion of the filmstrip of FIG. 1.
Figure 4:
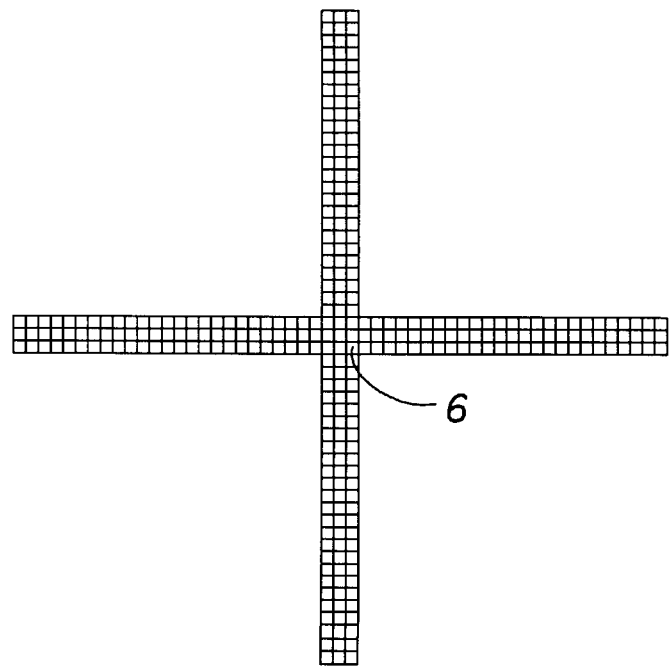
FIG. 4 is an enlarged view of a portion of the filmstrip of FIG. 1.

Finding the distance $|fid_1-fid_2|_{inches}$ between fiducial marks 1 and 2 and the distance $|fid_1-fid_3|_{inches}$ between fiducial marks 1 and 3 on the filmstrip is done by the firmware in the scanner. As illustrated in FIGS. 3 and 4, where there are plural rows and columns of pixels representing the center of the fiducial mark, any pixel can be chosen as the reference pixel, such as the bottom right hand pixel 5 in FIG. 3 and 6 in FIG. 4. That is, the bottom right pixel can be used regardless of the number of rows and columns representing the center of the fiducial mark.

The number of pixels $|fid_1-fid_2|_{pixels}$ (herein referred to as the "pixel distance") between the reference pixels of fiducial marks 1 and 2 in the digital image and the number of pixels $|fid_1-fid_3|_{pixels}$ between the reference pixels of fiducial marks 1 and 3 in the digital image is determined.

Image editing such as red eye correction can be done in a package like PhotoShop™. PhotoShop™ references the top-left corner of the image as the reference (0,0) coordinate. Selected pixels to be corrected must be referenced with respect to fiducial mark 1 in order to find the same pixel on another scan using the same or a different scanner. This is expressed by the equations:

$$R(x)=F(x)-P(x)$$

$$R(y)=F(y)-P(y)$$

where:

- R is the location of the pixel we desire to correct with respect to fiducial mark 1;
- F is the location of reference pixel 9 or 10 of the fiducial mark with respect to the pixel referencing system of a software package (e.g. PhotoShop™); and
- P is the location of the pixel we desire to correct with respect to the pixel referencing system of a software package (e.g. PhotoShop™).

These corrections are applied with respect to reference pixel 9 or 10 within fiducial mark 1. The equations used to compute "Inches-to-pixels" conversion factors $\alpha(x)$ and $\alpha(y)$ for the "x" and "y" directions, respectively are computed by the following equations:

$$\alpha(x) = \frac{fid_1 - fid_2(\text{inches})}{fid_1 - fid_2(\text{pixels})}$$

$$\alpha(y) = \frac{fid_1 - fid_3(\text{inches})}{fid_1 - fid_3(\text{pixels})}$$

The correction location with respect to the reference fiducial mark is found in inches by multiplying R(x) by $\alpha(x)$ and R(y) by $\alpha(y)$ to convert the distances from pixels to inches. The following information can then be stored on the film:

Original RGB values
Corrected RGB values
"Inches to Pixels" Conversion Factor: $\alpha$
Correction location with respect to the reference fiducial 1 (inches): R*$\alpha$
Correction location with respect to the reference fiducial 1 (pixels): R
Original Scan Resolution
Distances |fid$_1$–fid$_2$| and |fid$_1$–fid$_3$| (inches).
Distances |fid$_1$–fid$_2$| and |fid$_1$–fid$_3$| (pixels).

To begin a second scan or to re-scan the image, the center of the fiducial marks are located on the film such as by using a densitometer in the manner described above. The following previously magnetically-recorded data is read from the film:

Original RGB values
Corrected RGB values
"Inches to Pixels" Conversion Factor: $\alpha$
Correction location with respect to fid$_1$ (inches): R*$\alpha$
Correction location with respect to fid$_1$ (pixels): R
Original Scan Resolution
Distances |fid$_1$–fid$_2$| and |fid$_1$–fid$_3$| (inches).
Distances |fid$_1$–fid$_2$| and |fid$_1$–fid$_3$| (pixels).

The new distance between fiducial marks (in pixels) is computed using the following formulas:

|fid$_1$–fid$_2$|$_{pixels}$ (new)

|fid$_1$–fid$_3$|$_{pixels}$ (new)

A scanner tolerance correction factor $\gamma(x,y)$, which should be very close to the value ONE, is computed using the following equation:

$$\gamma(x, y) = \frac{|fid_1 - fid_2|\text{new (pixels)}}{|fid_1 - fid_2|\text{old (pixels)}}$$

A resolution scaling factor $\rho(x, y)$ is computed using the equation:

$$\rho(x, y) = \frac{\text{New\_Resolution}}{\text{Old\_resolution}}$$

Using the scanner tolerance correction factor $\gamma(x,y)$, the resolution scaling factor $\rho(x,y)$, and the "inches to pixels" conversion factor $\alpha$, the corrected pixel location $R_{corrected}$ is found by the equation:

$$R_{corrected}=R*\gamma*\rho*\alpha$$

Corrections can now be made using the corrected pixel location.

The invention has been described in detail with particular reference to preferred embodiments thereof, but it will be understood that variations and modifications can be effected within the spirit and scope of the invention.

What is claimed is:

1. A process for obtaining image coordinates of a selected pixel of a digital image scanned from an original image on photographic film that has at least two fiducial marks on the photographic film that are associated with the original image, said process comprising the steps of:

scanning an area of the photographic film, including the original image and the fiducial marks, with an original scan resolution to form an original digital image;

detecting the dimensional position of the fiducial marks in the original digital image;

determining the dimensional distance |fid$_1$–fid$_2$| between pairs of the fiducial marks;

determining the number of pixels in the original digital image between said pairs of fiducial marks; and referencing image coordinates of a location R of the selected pixel with respect to the fiducial marks, said referencing step is effected by:

computing a dimension-to-pixel conversion factor $\alpha$ by dividing the dimensional distance |fid$_1$–fid$_2$| between pairs of the fiducial marks by the number of pixels in the original digital image between said pairs of fiducial marks, and storing the dimension-to-pixel conversion factor $\alpha$, the reference location R of the selected pixel, the original scan resolution, the dimensional distance |fid$_1$–fid$_2$| between pairs of the fiducial marks, and the number of pixels in the original digital image between said pairs of fiducial marks on the film.

2. A process for obtaining image coordinates of a selected pixel of a digital image as set forth in claim 1 further comprising the steps of:

re-scanning the area of the photographic film with a re-scan resolution to form a re-scan digital image;

detecting the position of the fiducial marks in the re-scan digital image;

reading the dimension-to-pixel conversion factor $\alpha$, the reference location R of the selected pixel, the original scan resolution, the distance |fid$_1$–fid$_2$| between pairs of the fiducial marks, and the number of pixels in the original digital image between said pairs of fiducial marks stored on the film;

determining the number of pixels in the re-scan digital image between said pairs of fiducial marks;

computing a scanner tolerance correction factor $\gamma$ by dividing the number of pixels in the original digital image between said pairs of fiducial marks by the number of pixels in the re-scan digital image between said pairs of fiducial marks;

computing a resolution scaling factor $\rho$ by dividing the re-scan resolution by the original scan resolution; and determining corrected image coordinates of the location $R_{corrected}$ of the selected pixel by multiplying the reference location R of the selected pixel, the scanner tolerance correction factor $\gamma$, the resolution scaling factor $\rho$, and the dimension-to-pixel conversion factor $\alpha$.

3. A process for obtaining image coordinates of a selected pixel of a digital image scanned from an original image on photographic film that has at least two fiducial marks on the photographic film that are associated with the original image, said process comprising the steps of:

scanning an area of the photographic film, including the original image and the fiducial marks, with an original scan resolution to form an original digital image;

detecting the dimensional position of the fiducial marks in the original digital image;

determining the dimensional distance $|fid_1-fid_2|$ between pairs of the fiducial marks;

determining the number of pixels in the original digital image between said pairs of fiducial marks; and referencing image coordinates of a location R of the selected pixel with respect to the fiducial marks relative to the location P of the selected pixel with respect to a pixel referencing system of an image manipulation software package such that $$R = P - P$$

where F is the location of the fiducial marks with respect to the pixel referencing system of the image manipulation software package, said referencing step is effected by:

computing a dimension-to-pixel conversion factor $\alpha$ by dividing the dimensional distance $|fid_1-fid_2|$ between pairs of the fiducial marks by the number of pixels in the original digital image between said pairs of fiducial marks, and storing the dimension-to-pixel conversion factor $\alpha$, the reference location R of the selected pixel, the original scan resolution, the dimensional distance $|fid_1-fid_2|$ between pairs of the fiducial marks, and the number of pixels in the original digital image between said pairs of fiducial marks on the film.

4. A process for obtaining image coordinates of pixels of a digital image as set forth in claim 3 further comprising the steps of:

re-scanning the area of the photographic film with a re-scan resolution to form a re-scan digital image;

detecting the position of the fiducial marks in the re-scan digital image;

reading the dimension-to-pixel conversion factor $\alpha$, the reference location R of the selected pixel, the original scan resolution, the distance $|fid_1-fid_2|$ between pairs of the fiducial marks, and the number of pixels in the original digital image between said pairs of fiducial marks stored on the film;

determining the number of pixels in the re-scan digital image between said pairs of fiducial marks;

computing a scanner tolerance correction factor $\gamma$ by dividing the number of pixels in the original digital image between said pairs of fiducial marks by the number of pixels in the re-scan digital image between said pairs of fiducial marks;

computing a resolution scaling factor $\rho$ by dividing the re-scan resolution by the original scan resolution; and determining corrected image coordinates of the location $R_{corrected}$ of the selected pixel by multiplying the reference location R of the selected pixel, the scanner tolerance correction factor $\gamma$, the resolution scaling factor $\rho$, and the dimension-to-pixel conversion factor $\alpha$.

5. A process for obtaining image coordinates of a selected pixel of a digital image scanned from an original image on photographic film that has at least three non-aligned fiducial marks $fid_1$, $fid_2$, and $fid_3$ on the photographic film that are associated with the original image, said process comprising the steps of:

scanning an area of the photographic film, including the original image and the fiducial marks, with an original scan resolution to form an original digital image;

detecting the dimensional position of the fiducial marks in the original digital image;

determining the dimensional distances $|fid_1-fid_2|$ and $|fid_1-fid_3|$ between pairs of the fiducial marks;

determining the number of pixels $|fid_1-fid_2|_{pixels}$ and $|fid_1-fid_3|_{pixels}$ in the original digital image between said pairs of fiducial marks; and referencing image coordinates of a location R of the selected pixel with respect to the fiducial marks, said referencing step is effected by:

computing a dimension-to-pixel conversion factor $\alpha(x)$ by dividing the dimensional distance $|fid_1-fid_2|$ between pairs of the fiducial marks by the number of pixels $|fid_1-fid_2|_{pixels}$ in the original digital image between pairs $fid_1$ and $fid_2$ of fiducial marks, computing a dimension-to-pixel conversion factor $\alpha(y)$ by dividing the dimensional distance $|fid_1-fid_3|$ between pairs of the fiducial marks by the number of pixels $|fid_1-fid_3|_{pixels}$ in the original digital image between pairs $fid_1$ and $fid_3$ of fiducial marks, and storing the dimension-to-pixel conversion factors $\alpha(x)$ and $\alpha(y)$, the reference location R of the selected pixel, the original scan resolution, the dimensional distances $|fid_1-fid_2|$ and $|fid_1-fid_3|$ between pairs of the fiducial marks, and the number of pixels $|fid_1-fid_2|_{pixels}$ and $|fid_1-fid_3|_{pixels}$ in the original digital image between said pairs of fiducial marks on the film.

6. A process for obtaining image coordinates of a selected pixel of a digital image as set forth in claim 5 further comprising the steps of:

re-scanning the area of the photographic film with a re-scan resolution to form a re-scan digital image;

detecting the position of the fiducial marks $fid_1$, $fid_2$, and $fid_3$ in the re-scan digital image;

reading the dimension-to-pixel conversion factors $\alpha(x)$ and $\alpha(y)$, the reference location R of the selected pixel, the original scan resolution, the distances $|fid_1-fid_2|$ and $|fid_1-fid_3|$ between pairs of the fiducial marks, and the number of pixels $|fid_1-fid_2|_{pixels}$ and $|fid_1-fid_3|_{pixels}$ in the original digital image between said pairs of fiducial marks stored on the film;

determining the number of pixels $|fid_1-fid_2|_{new\text{-}pixels}$ and $|fid_1-fid_3|_{new\text{-}pixels}$ in the re-scan digital image between said pairs of fiducial marks;

computing a scanner tolerance correction factor $\gamma(x,y)$ by dividing the number of pixels in the original digital image between said pairs of fiducial marks by the number of pixels in the re-scan digital image between said pairs of fiducial marks;

computing a resolution scaling factor $\rho(x,y)$ by dividing the re-scan resolution by the original scan resolution; and determining corrected image coordinates of the location $R_{corrected}$ of the selected pixel by multiplying the reference location R of the selected pixel, the scanner tolerance correction factor $\gamma(x,y)$, the resolution scaling factor $\rho(x,y)$, and the dimension-to-pixel conversion factors $\alpha(x)$ and $\alpha(y)$.

* * * * *